US012741294B2

(12) United States Patent
Paramban et al.

(10) Patent No.: US 12,741,294 B2
(45) Date of Patent: Sep. 22, 2026

(54) APPARATUSES, SYSTEMS, AND METHODS FOR ISOLATING A NOZZLE OF A VESSEL

(71) Applicant: Saudi Arabian Oil Company, Dhahran (SA)

(72) Inventors: Sunil Javed Paramban, Dhahran (SA); Alawi Adnan Alsayegh, Qatif (SA); Abdulaziz A. Al-Megren, Dammam (SA); Sayee Prasad Raghunathan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 359 days.

(21) Appl. No.: 18/402,948

(22) Filed: Jan. 3, 2024

(65) Prior Publication Data

US 2025/0214097 A1 Jul. 3, 2025

(51) Int. Cl.

*B05B 11/10* (2023.01)
*B05B 1/32* (2006.01)
*B05B 11/00* (2023.01)
*G01M 3/26* (2006.01)

(52) U.S. Cl.

CPC .............. *B05B 11/105* (2023.01); *B05B 1/32* (2013.01); *B05B 11/0032* (2013.01); *B05B 11/0038* (2018.08); *B05B 11/0094* (2013.01); *G01M 3/26* (2013.01)

(58) Field of Classification Search

CPC ..... B05B 11/105; B05B 1/32; B05B 11/0032; B05B 11/0038; B05B 11/0094

USPC .............................................................. 73/40

See application file for complete search history.

(56) References Cited

U.S. PATENT DOCUMENTS 4,856,937 A * 8/1989 Grocott .................. G02B 6/502 405/183.5
6,059,967 A * 5/2000 Field .................. B01D 24/4631 210/275
6,131,441 A 10/2000 Berube et al.
6,772,777 B1 8/2004 Mann
8,028,565 B2 10/2011 Gotowik et al.
2002/0148294 A1* 10/2002 Bond .................... G01M 3/246 73/592

* cited by examiner

*Primary Examiner* — Peter J Macchiarolo
*Assistant Examiner* — John M Royston
(74) *Attorney, Agent, or Firm* — Dinsmore & Shohl LLP

(57) ABSTRACT

An apparatus for isolating a nozzle having an outer end extending externally from a vessel and an inner end opening into the interior of the vessel comprises: a rod comprising proximal and distal ends; an umbrella comprising an end member and a canopy; an actuation portion configured to actuate the umbrella between a retracted position comprising the first angle and a protracted position comprising a second angle, wherein the second angle is greater than the first angle and the umbrella is capable of being translated through the nozzle at the first angle and is not capable of being translated through the nozzle at the second angle; and an engagement surface defined on a leading edge of the canopy, the engagement surface configured to form a seal against an interior wall of the vessel when the umbrella is in the protracted position.

20 Claims, 8 Drawing Sheets

APPARATUSES, SYSTEMS, AND METHODS FOR ISOLATING A NOZZLE OF A VESSEL

TECHNICAL FIELD

The present disclosure relates to apparatuses, systems, and methods of isolating and/or testing connections between a vessel and a pipe and/or nozzle extending therefrom, and also to apparatuses, systems, and methods for pressure testing of a nozzle of a vessel.

BACKGROUND

In industrial applications such as oil or gas refineries, off-shore drilling and production platforms, pulp and paper plants, power utilities, oil and gas wells, marine facilities, or any other industry or plant involving vessels, nozzles often need to be welded or fitted to the vessel to permit the attachment of, for example, sensors. Oftentimes, isolation of the nozzle during the welding or fitting process is also desired. Furthermore, the integrity of the resulting vessel nozzle welds or fittings often needs to be tested. In the oil and gas industry, for example, tight environmental and operating regulations exist on emissions from a weld or joint. Furthermore, as there are thousands of welds in each plant, it is in the industry's best interests to minimize the amount of fluid lost from each weld. Testing tools are therefore required to test the integrity and permeability of nozzle welds. Nozzle fittings must also be tested after welding to test and confirm structural strength.

Conventionally, pressure testing of a vessel nozzle is accomplished by pressurizing the entire vessel. Such testing is time consuming, expensive, and can create potential hazards. In addition, welding operations utilized to join nozzles or branch connections to existing vessels may be performed in the presence of combustible or otherwise harmful materials or vapors which are present within the vessel.

Accordingly, various apparatuses have been developed to isolate and pressure test nozzles without needing to pressurize the entire vessel. For example, U.S. Pat. No. 8,028,565 B2 by Gotowik et al. ("Gotowik") discloses a tool and method for isolating and testing a connection to a vessel that is adaptable to various vessel configurations and that self-expands against the vessel wall to seal when pressure testing is conducted.

SUMMARY

However, Gotowick and the other isolation apparatuses in the art have a noticeable drawback in their design. Particularly, Gotowick's apparatus must be inserted into the vessel from the inside out, significantly limiting its application to settings and vessels wherein internal access is impractical. Further, even in larger vessels where access to the interior is technically enabled, safety and confined space operating conditions and/or permitting may add additional cost and risk safety to operators installing the apparatus. Accordingly, desired are isolation apparatuses that may be installed, operated, and removed all from the exterior of the vessel.

Embodiments herein accomplish the aforementioned need by providing an apparatus for isolation of a nozzle of a vessel that may be translated through the nozzle from the exterior of the vessel in a retracted position, actuated to the protracted position within the vessel, then sealed against the interior wall of the vessel for isolation and/or pressure testing. When the pressure test and/or isolation is concluded or no longer needed, the apparatus may be de-actuated and subsequently removed from the vessel through the nozzle in the same manner in which it was inserted. Each of these operations may be conducted from the exterior of the vessel, providing significant advantages over the prior art in which insertion, operation, or adjustment is required from the inside of the vessel.

These benefits, among others, are achieved through the use of a rod, coupled umbrella, actuation portion, and engagement surface. When in the retracted position, the umbrella may be translatable through (both into and out of) the nozzle. Upon actuation through the actuation portion, the umbrella may protract, at which point the engagement surface of the umbrella may form a seal against the interior wall of the vessel, thereby defining a sealed interior space between an interior wall of the canopy, a central opening of the housing, an interior wall of the vessel, and an interior wall of the nozzle. Upon fluid pressurization, the connection point between the nozzle and the vessel may be observed for leakages, such as within the welded portion attaching the nozzle to the vessel. Upon depressurization, the umbrella may be de-actuated to the retracted position and removed from the vessel. Furthermore, in isolation applications, an inert gas may be injected into the sealed interior space to prevent oxidation in the welding or fitting process.

Without being limited by theory, for large vessels requiring confined space permitting, this may be of considerable benefit to time, cost, and safety, as persons are not required to enter the confined space to remove the apparatus from the inside of the vessel. Furthermore, for small vessels such as individual pipes of a pipeline, the isolation and/or pressure testing may be conducted without requiring the pipeline to be dissembled to permit internal access, resulting again in considerable benefits to time and cost.

In accordance with one embodiment herein, an apparatus for isolating a nozzle having an outer end extending externally from a vessel and an inner end opening into the interior of the vessel comprises: a rod comprising proximal and distal ends; an umbrella comprising an end member and a canopy, wherein the umbrella is coupled to the distal end of the rod, the canopy is in contact with the end member, and the canopy extends from the end member at a first angle to the rod; an actuation portion configured to actuate the umbrella between a retracted position comprising the first angle and a protracted position comprising a second angle, wherein the second angle is greater than the first angle and the umbrella is capable of being translated through the nozzle at the first angle and is not capable of being translated through the nozzle at the second angle; and an engagement surface defined on a leading edge of the canopy, the engagement surface configured to form a seal against an interior wall of the vessel when the umbrella is in the protracted position.

In accordance with another embodiment herein, an isolation system a nozzle of a vessel comprises a vessel and an apparatus for isolating the nozzle. The vessel comprises a nozzle, the nozzle comprising an outer end extending externally from the vessel and an inner end opening into the interior of the vessel. The apparatus comprises a housing comprising a nozzle-contacting portion, a non-nozzle-contacting portion, and a central opening, wherein the nozzle-contacting portion is configured to fasten to the outer end of the nozzle, the central opening extends from the non-nozzle-contacting portion to the nozzle-contacting portion, the central opening is sized to accept a rod of the apparatus, and the opening comprises a sealing element positioned on the non-nozzle-contacting portion, the rod comprising proximal and distal ends, wherein the rod is positioned within the central opening and has the proximal portion of the rod positioned past the non-nozzle-contacting portion, an umbrella comprising an end member and a canopy, wherein the umbrella is coupled to the distal end of the rod, the canopy is in contact with the end member, and the canopy extends from the sealing cap at a first angle to the rod, an actuation portion configured to actuate the umbrella between a retracted position comprising the first angle and a protracted position comprising a second angle, wherein the second angle is greater than the first angle and the umbrella is capable of being translated through the nozzle at the first angle and is not capable of the same at the second angle, an engagement surface defined on a leading edge of the canopy, the engagement surface configured to form a seal against an interior wall of the vessel when the umbrella is in the protracted position, an inlet flow line fluidly connected to the central opening, and an outlet flow line fluidly connected to the central opening.

In accordance with yet another embodiment herein, a method of isolating a nozzle having an outer end extending externally from a vessel and an inner end opening into the interior of the vessel comprises providing an apparatus for isolating the nozzle; fastening the apparatus to the outer end of the nozzle; inserting the umbrella through the inner end of the nozzle; actuating the umbrella to the protracted position through the actuation portion; and sealing the engagement surface against the interior wall of the vessel.

In the previous embodiment, the apparatus for isolating the nozzle may comprise a housing comprising a nozzle-contacting portion, a non-nozzle-contacting portion, and a central opening, wherein the nozzle-contacting portion is configured to fasten to the outer end of the nozzle, the central opening extends from the non-nozzle-contacting portion to the nozzle-contacting portion, the central opening is sized to accept a rod of the apparatus, and the opening comprises a sealing element positioned on the non-nozzle-contacting portion, the rod comprising proximal and distal ends, wherein the rod is positioned within the central opening and has the proximal portion of the rod positioned past the non-nozzle-contacting portion, an umbrella comprising an end member and a canopy, wherein the umbrella is coupled to the distal end of the rod, the canopy is in contact with the end member, and the canopy extends from the sealing cap at a first angle to the rod, an actuation portion configured to actuate the umbrella between a retracted position comprising the first angle and a protracted position comprising a second angle, wherein the second angle is greater than the first angle and the umbrella is capable of being translated through the nozzle at the first angle and is not capable of the same at the second angle, an engagement surface defined on a leading edge of the canopy, the engagement surface configured to form a seal against an interior wall of the vessel when the umbrella is in the protracted position, an inlet flow line fluidly connected to the central opening, and an outlet flow line fluidly connected to the central opening.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

As used herein, "vessel" may generally refer to a hollow body comprising a first end face, a second end face, and one or more sidewalls extending from the first end face to the second end face. "Vessel", as referred to herein, may also be regarded as a tank, a pipe, or any other terms generally fulfilling the definition of the vessel referred to above. Similarly, "nozzle", as used herein, may also be regarded as a pipe, branch pipe, T-connection, fitting, or any other terms that may generally be regarded as a joint or connection from a vessel, tank, or another pipe.

Figure 1:
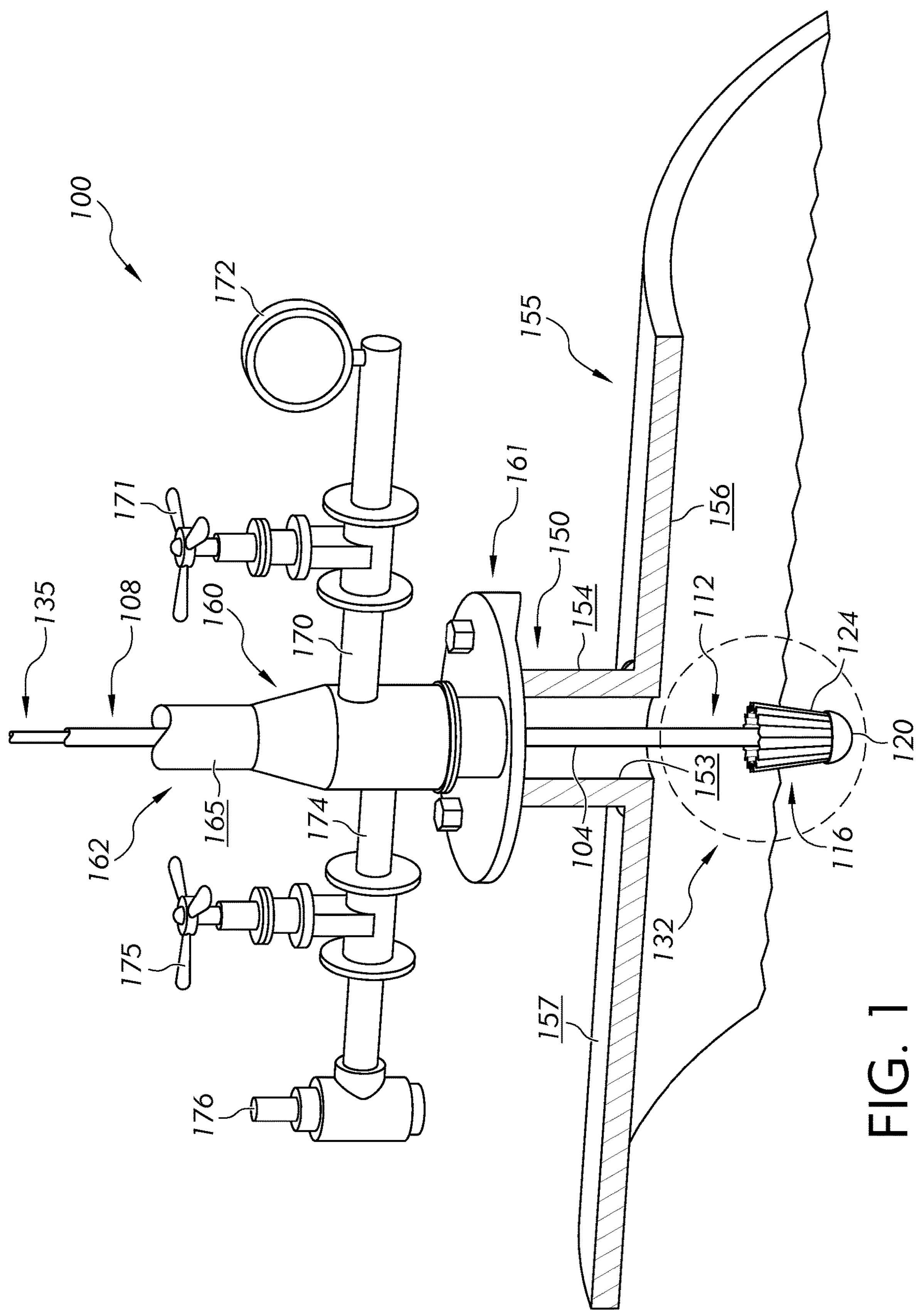
FIG. 1 illustrates a perspective view of an apparatus for isolating a nozzle in a retracted position, according to one or more embodiments herein.

As previously stated, embodiments herein are directed to apparatuses, systems, and methods of testing and/or isolating connections between a vessel and a pipe and/or nozzle extending therefrom, and also to apparatuses, systems, and methods for pressure testing of the nozzle of the vessel. Now referring to the FIGS. 1-8, illustrated are apparatuses 100 for isolating a nozzle 150 having an outer end 151 extending externally from a vessel 155 and an inner end 152 opening into the interior of the vessel 155. The apparatus for isolating a nozzle may also be referred to herein as an "isolation apparatus", an "apparatus", or a "pressure testing apparatus", although the apparatus 100 should not be construed as being solely limited to the stated use thereof. FIGS. 1, 5, and 7 illustrate the apparatus 100 in perspective view. FIGS. 2, 3, 4, 6, and 8 illustrate the apparatus 100 in cross-sectional view.

As shown in FIGS. 1-8, the vessel 155 may comprise a vessel interior wall 156 and a vessel exterior wall 157. Similarly, the nozzle 150 may comprise a nozzle interior wall 153 and a nozzle exterior wall 154. The nozzle 150 and the vessel 155 may be coupled together by welds 158, although other coupling means are contemplated.

Figure 2:
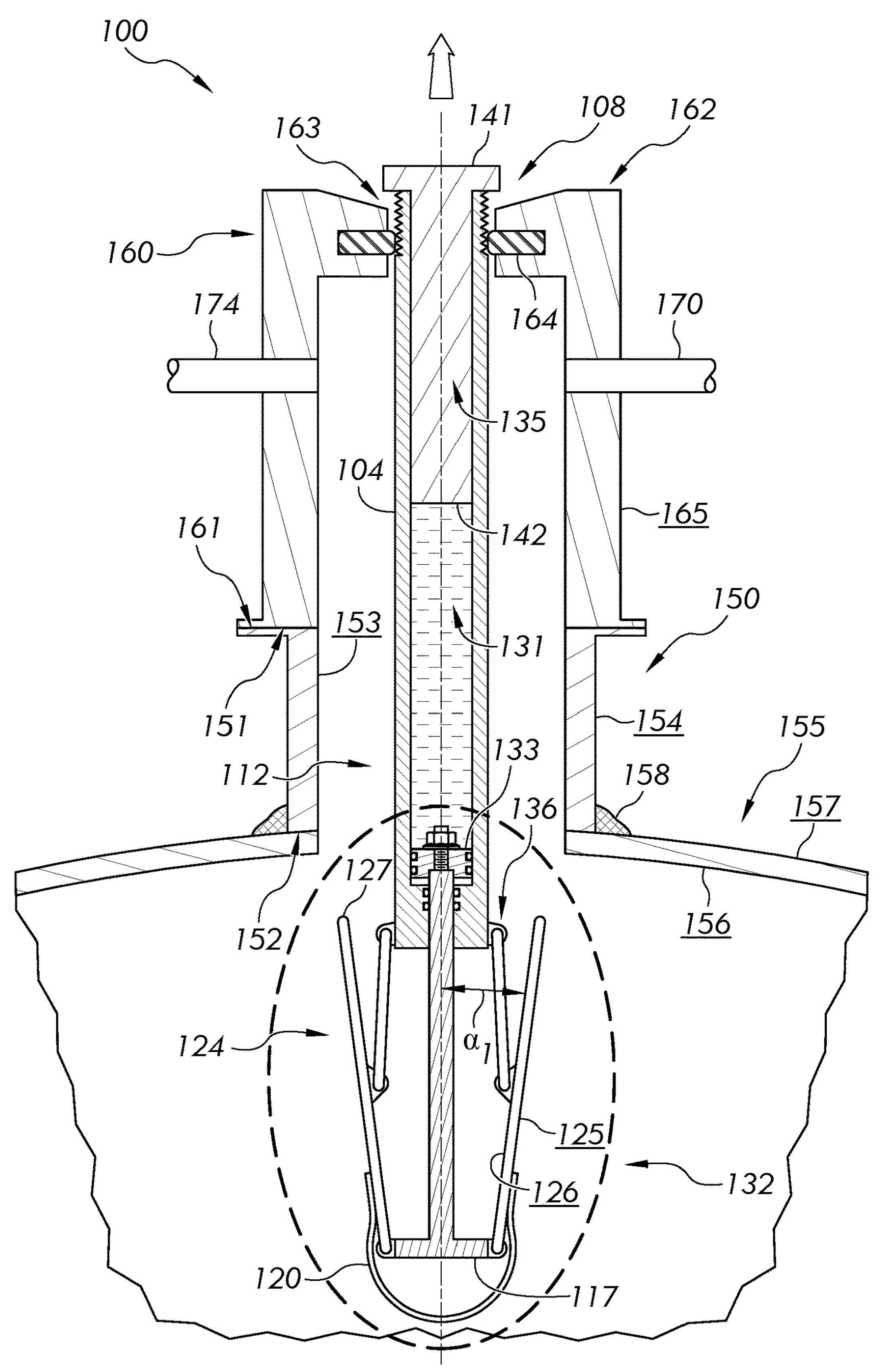
FIG. 2 illustrates a cross-sectional view of the apparatus for isolating a nozzle of FIG. 1, according to one or more embodiments herein.
Figure 3:
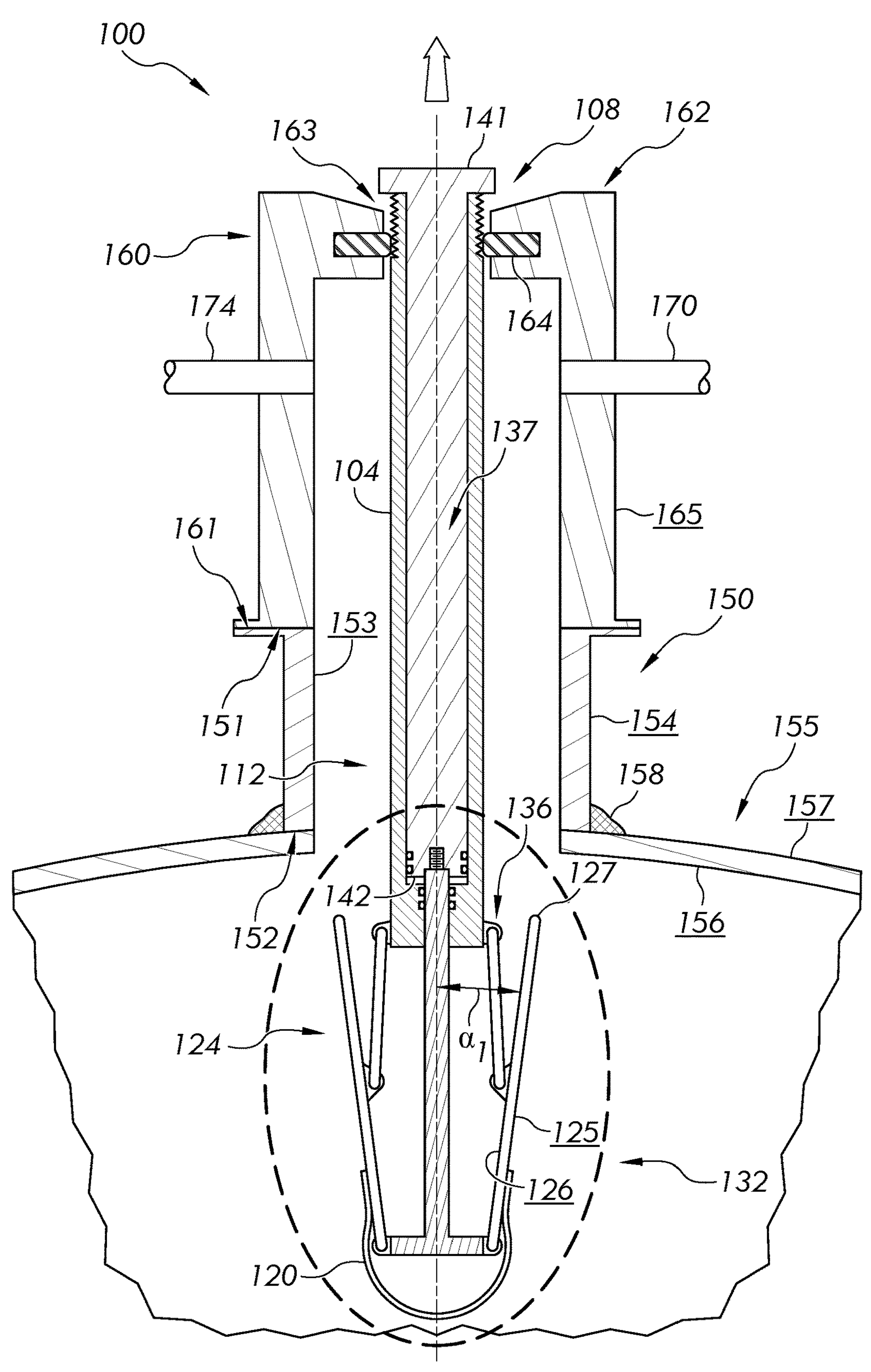
FIG. 3 illustrates a cross-sectional view of an apparatus for isolating a nozzle with a single plunger, according to one or more embodiments herein.

As shown in FIGS. 1-2, the apparatus 100 may comprise a rod 104, an umbrella 116, an actuation portion 132, and an engagement surface 127. The rod 104 may comprise a proximal end 108 and a distal end 112. The umbrella 116 may comprise an end member 117 and a canopy 124. As shown in FIG. 2, the umbrella 116 may be coupled to the distal end 112 of the rod 104, as explained in more detail herein. The canopy 124 may be in contact with the end member 117 of the umbrella 116, such as the canopy 124 being pivotally coupled to the end member 117, although this is not required. The canopy 124 may comprise a canopy outer exterior wall 125 and a canopy interior surface 126. The canopy 124 may also extend from the end member 117 at a first angle "$\alpha_1$" to the rod 104. Particularly, as shown in FIG. 2, the first angle may be measured from a central axis of the rod 104 to a canopy interior surface 126.

As shown in FIGS. 1-8, the apparatus 100 may further comprise a housing 160. The housing 160 may comprise a nozzle-contacting portion 161 configured to fasten to the outer end 151 of the nozzle 150 as well as a non-nozzle-contacting portion 162, which may be arranged at the opposite end of housing 160 from the nozzle-contacting portion 161. As shown in FIGS. 2-4, 6, and 8, the housing 160 may also comprise a central opening 163, wherein the central opening 163 extends from the non-nozzle-contacting portion 162 to the nozzle-contacting portion 161. The central opening 163 may also be substantially in line with the nozzle 150.

As shown in FIGS. 1-8, the central opening 163 of the housing 160 may be sized to accept the rod 104, such that the rod 104 is positioned within the central opening 163 and has the proximal portion of the rod 104 positioned outside the housing 160. As shown in FIGS. 2-4, 6, and 8, the central opening 163 may also further comprise one or more sealing elements 164 positioned on the non-nozzle-contacting portion 162. In embodiments, the one or more sealing elements 164 may include, but may not be limited to an O-ring, a washer, a gasket, or combinations thereof, such that the one or more sealing elements 164 may be configured to maintain a pressure seal against the atmosphere between the rod 104 and the central opening 163, i.e., may prevent fluid leakage from the central opening 163 out of the housing 160.

By the sizing of the central opening 163, the rod 104 may be withdrawn and inserted into the central opening 163, and thereby withdrawn/inserted into the nozzle 150/vessel 155. Accordingly, to prevent unintended sliding of the rod 104 during pressurization and/or pressure testing, the rod 104 may further include a locking portion 109 on the proximal portion of the rod 104, as shown at least in FIGS. 6 and 8. The apparatus 100 may in turn further comprise a fastener 110, such that when the fastener 110 is attached to the locking portion 109, further insertion of the rod 104 into the housing 160 is prevented. Without being limited by theory, and as explained in further detail herein, the combination of the locking portion 109 and the fastener 110 may allow the rod 104 to be held in place during pressurization and/or pressure testing, thereby preventing a sliding of the rod 104 further into the housing 160. In embodiments, the locking portion 109 may comprise a plurality of threads, and the fastener 110 may comprise a threaded nut or snap ring.

In embodiments, and as shown in FIG. 1, the apparatus 100 may further comprise an inlet flow line 170 and an outlet flow line 174 that are both fluidly connected to the central opening 163. The apparatus 100 may also comprise an inlet valve 171 fluidly connected to the inlet flow line 170 and an outlet valve 175 fluidly connected to the outlet flow line 174. As shown in FIG. 1, the inlet valve 171, the outlet valve 175, or both may be gate valves, although this is not required. The apparatus 100 may also comprise one or more pressure sensors or transducers 172/176 that may be configured to sense a fluid pressure within the housing 160.

As previously stated, the apparatus 100 may comprise the actuation portion 132. In embodiments, the actuation portion 132 may be configured to actuate the umbrella 116 between a retracted position (as illustrated in FIGS. 1-4) comprising the first angle and a protracted position (as illustrated in FIGS. 5-8) comprising a second angle "$\alpha_2$", wherein the second angle is greater than the first angle. As shown in FIGS. 1-4, the umbrella 116, and thereby the apparatus 100, may be capable of being translated through the nozzle 150 at the first angle, in other words, when in the retracted position. However, as shown in FIGS. 5-8, the umbrella 116, and thereby the apparatus 100, may not be capable of being translated through the nozzle 150 at the second angle. Although not shown, the actuation portion 132 may be configured to actuate the umbrella 116 into a further protracted position comprising a third angle "$\alpha_3$" or an intermediate position comprising a fourth angle "$\alpha_4$", wherein the third angle may be greater than the second angle and the fourth angle may be less than the second angle and greater than the first angle.

The actuation portion 132 may have a variety of forms, as explained in further detail herein. For example, and as illustrated in FIGS. 2-4, 6, and 8, the actuation portion 132 may comprise a plurality of spoke members 136. The plurality of spoke member 136 may be pivotally coupled at one end to the distal end 112 of the rod 104 and pivotally coupled at the opposite end to an interior surface of the canopy 124. The actuation portion 132 may further comprise an aperture 139 within the rod 104 that extends from the distal end 112 to the proximal end 108 of the rod 104.

As illustrated in FIG. 2, the actuation portion 132 may further comprise a first plunger 133 and a second plunger 135. The first plunger 133 may be positioned within the aperture 139 on the distal end 112 of the rod 104 and may also be coupled to the end member 117 of the umbrella 116. As shown at least in FIG. 6, the second plunger 135 may comprise a handle end 141 positioned past the proximal end 108 of the rod 104 and a far end 142 extending within the aperture 139. In embodiments, the first plunger 133 and the second plunger 135 may define a sealed space 131 within the aperture 139 between the first and second plungers, such that withdrawing the second plunger 135 from the proximal end 108 of the rod 104 operates to also translate the first plunger 133 towards the proximal end 108, thereby also translating the umbrella 116 into the intermediate, protracted, or further protracted positions. Similarly, advancing the second plunger 135 into the proximal end 108 of the rod 104 may operate to also translate the first plunger 133 towards the proximal end 108, thereby also translating the umbrella 116 into the intermediate position or retracted position.

Figure 6:
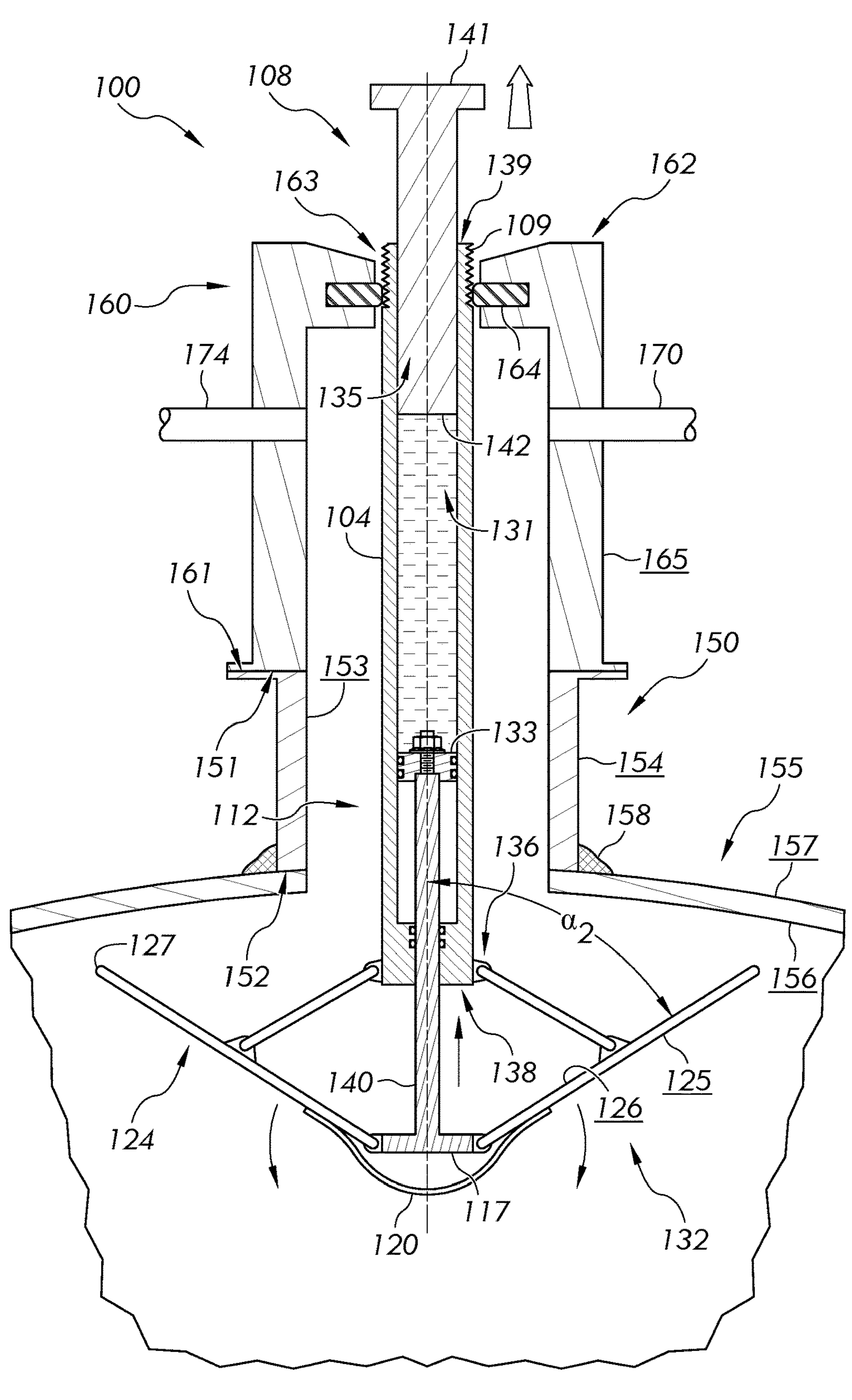
FIG. 6 illustrates a cross-sectional view of the apparatus for isolating a nozzle of FIG. 5, according to one or more embodiments herein.
Figure 7:
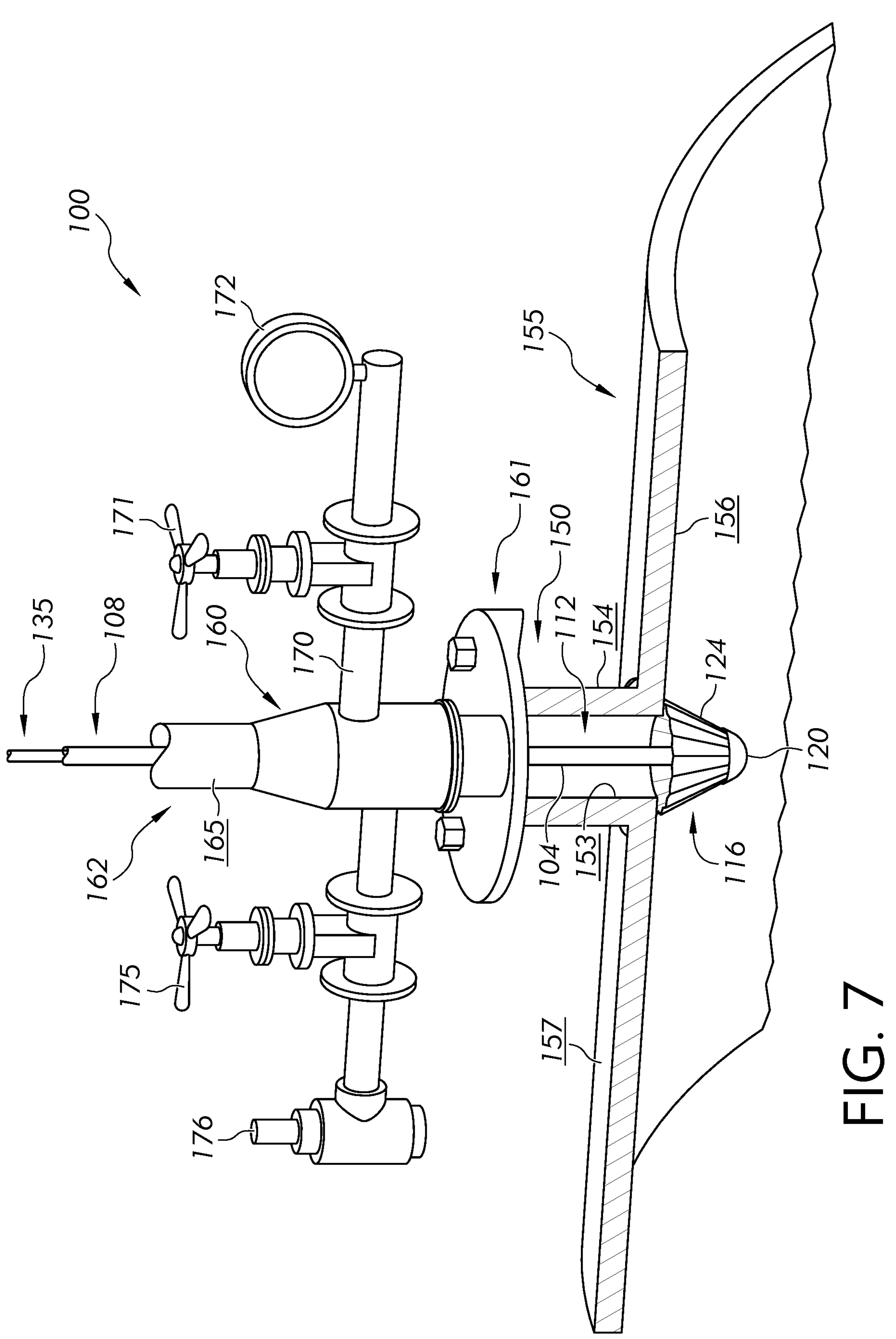
FIG. 7 illustrates a perspective view of the apparatus for isolating a nozzle in a protracted position sealed against the interior wall of the vessel, according to one or more embodiments herein.
Figure 8:
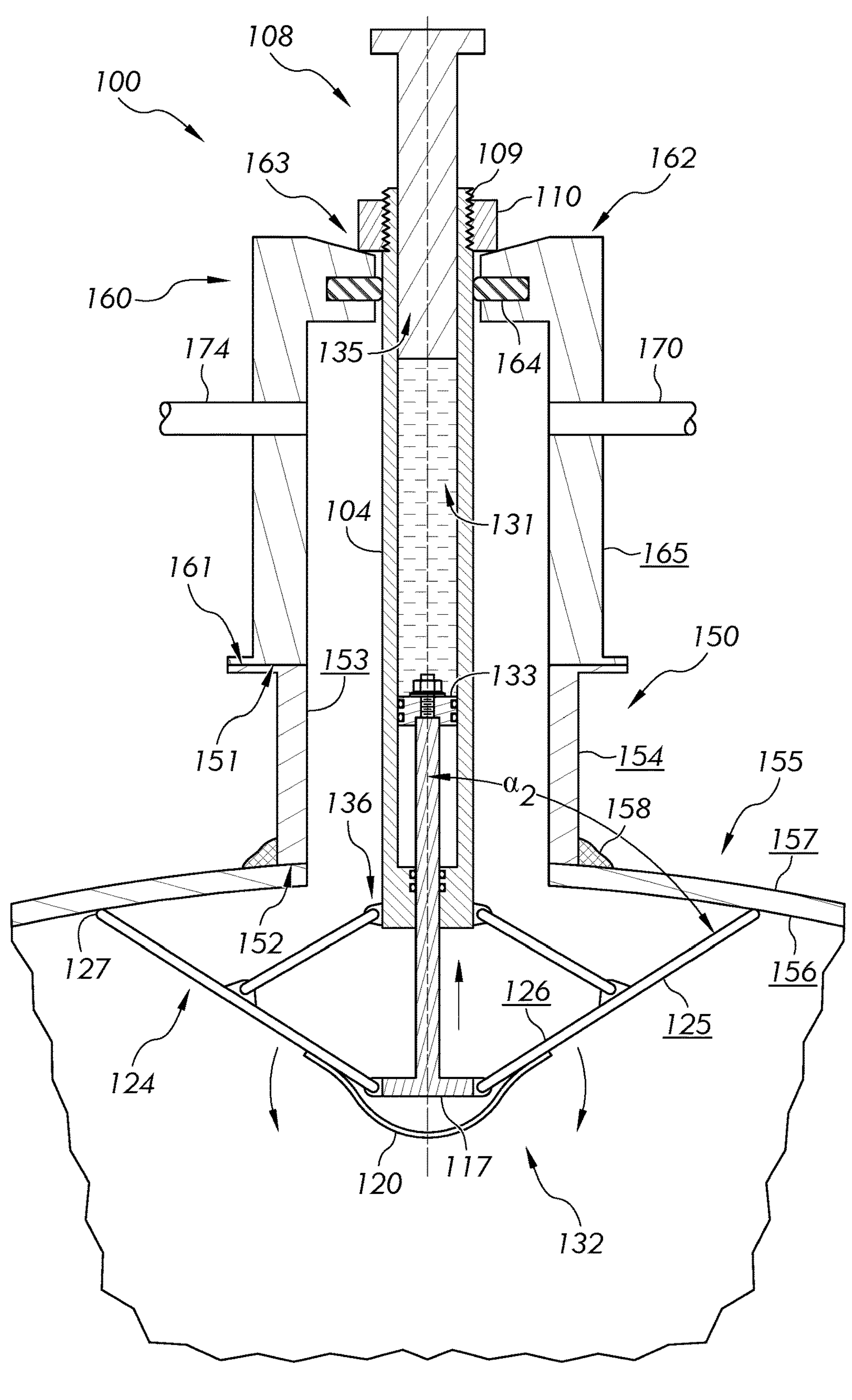
FIG. 8 illustrates a cross-sectional view of the apparatus for isolating a nozzle of FIG. 7, according to one or more embodiments herein.

As illustrated in FIGS. 2, 6, and 8, the sealed space 131 may be filled with a hydraulic fluid, including but not limited to an oleaginous or aqueous fluid.

Figure 4:
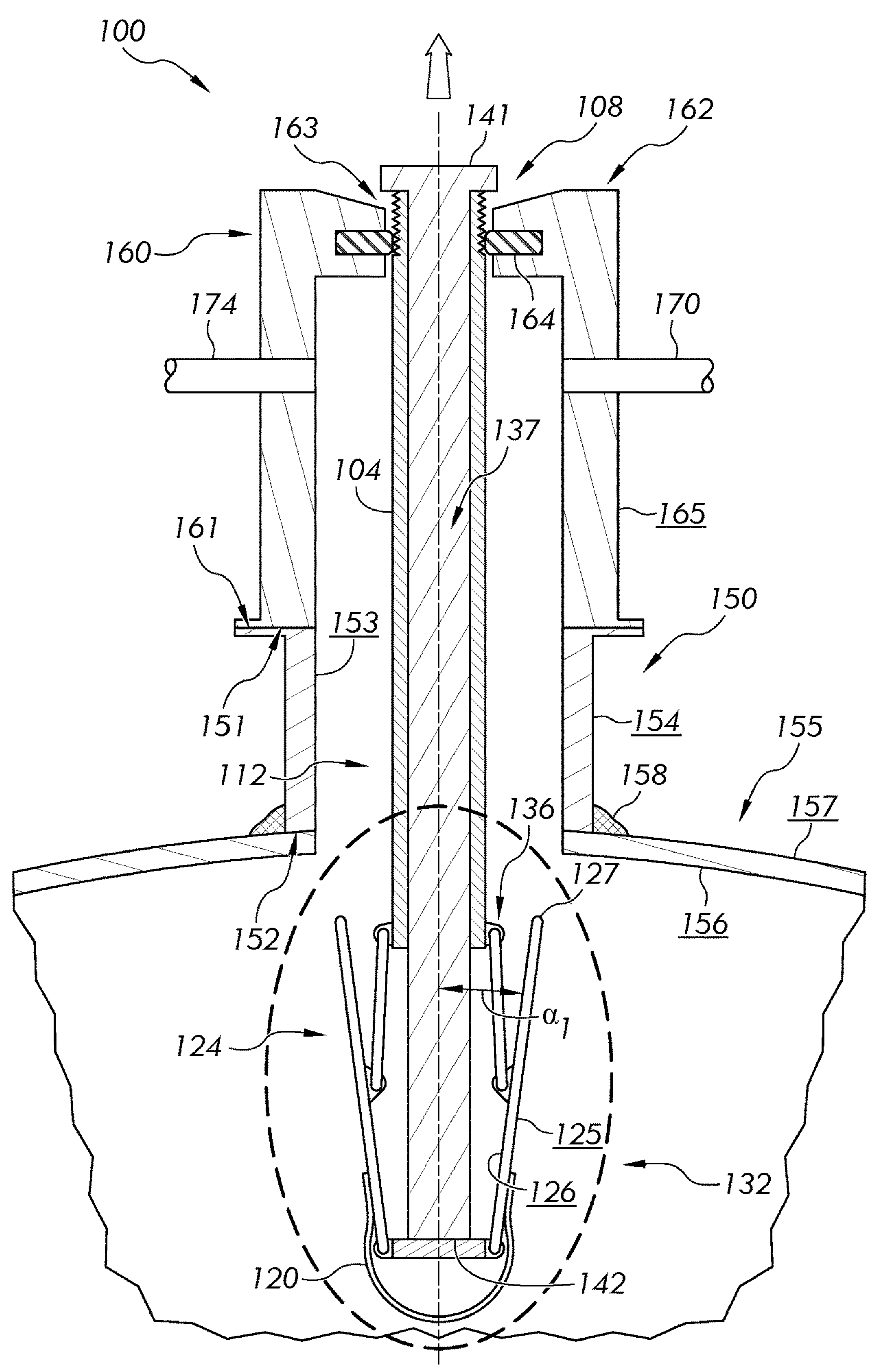
FIG. 4 illustrates a cross-sectional view of an apparatus for isolating a nozzle with a single plunger and aperture, according to one or more embodiments herein.
Figure 5:
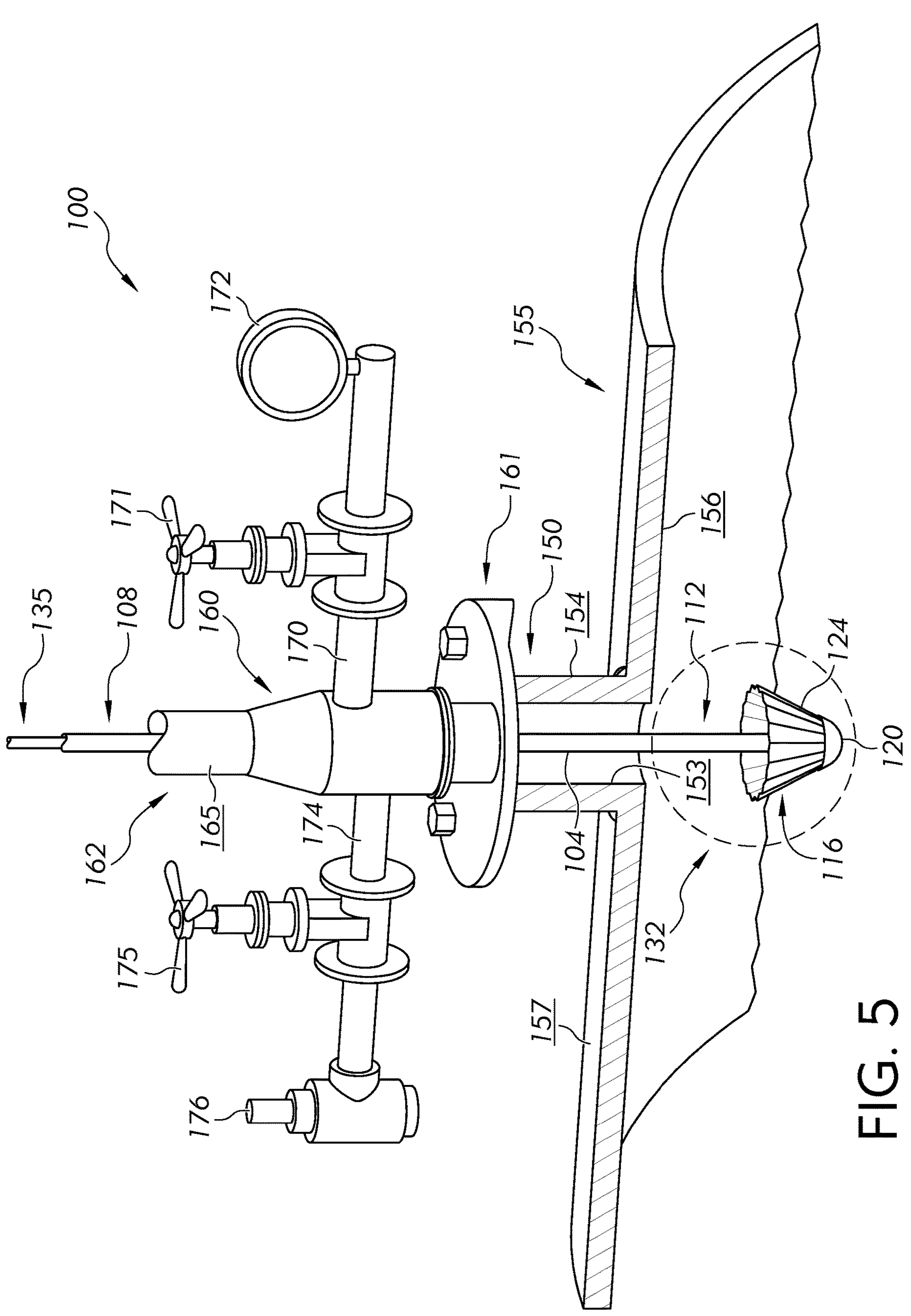
FIG. 5 illustrates a perspective view of an apparatus for isolating a nozzle in a protracted position, according to one or more embodiments herein.

As illustrated in FIG. 4, the actuation portion 132 may further comprise an internal shaft 137. The internal shaft 137 may extend through the aperture 139 and may have the handle end 141 positioned past the proximal end 108 of the rod 104 and the far end 142 coupled to the end member 117, such that withdrawing the internal shaft 137 from the proximal end 108 of the rod 104 may translate the umbrella 116 into the intermediate, protracted, or further protracted positions. Similarly, advancing the internal shaft 137 into the proximal end 108 of the rod 104 may thereby also translate the umbrella 116 into the intermediate position or retracted position. Although not illustrated, the actuation portion 132 may further comprise a bushing interposed between the internal shaft 137 and an internal wall of the rod 104.

As illustrated in FIGS. 2, 3, 6, and 8, the aperture 139 may further comprise an aperture throat 138 on the distal end 112 of the rod 104. As shown at least in FIG. 2, the aperture throat 138 may comprise a smaller diameter than the remainder of the aperture 139. As shown in FIGS. 2, 3, 6, and 8, the first plunger 133 or the internal shaft 137 may further comprise a protrusion 140 extending from the far end 142 of the first plunger 133 or internal shaft 137. The protrusion 140 may be sized to fit within the aperture throat 138 and may be coupled to the end member 117 of the umbrella 116. The protrusion 140 may also be coupled to the first plunger 133 or internal shaft 137 by a plurality of threads, by a male-female threaded connector, or both. Accordingly, as illustrated in FIGS. 2, 3, 6, and 8 the aperture throat 138 and the protrusion 140 may together define a maximum distance by which the first plunger 133 and the second plunger 135, or the internal shaft 137, may extend into the aperture 139. As also shown in FIGS. 2, 3, 6, and 8, the aperture 139, the aperture throat 138, the internal shaft 137, the first plunger 133, the second plunger 135, the protrusion 140, or combinations thereof may further comprise one or more sealing elements 164, similar or identical to the one or more sealing elements 164 of the housing 160.

As previously stated, the apparatus 100 may comprise the engagement surface 127. The engagement surface 127 may be defined on a leading edge of the canopy 124. As used herein, a "leading edge" of the canopy 124 may be defined as the surface of the canopy 124 positioned farthest from the end member 117, i.e., the surface at the edge of the umbrella 116. The engagement surface 127 may also be configured to form a seal against the vessel interior wall 156, such as when the umbrella 116 is in the protracted position. Accordingly, when the seal is in place, a sealed interior space may be defined between the canopy interior surface 126, the central opening 163, the vessel interior wall 156, and the nozzle interior wall 153.

The engagement surface 127 may comprise a variety of sealing mechanisms, such as, but not limited to, a plurality of ridges, a deformable material, or both. In embodiments, the sealing mechanisms may be configured to substantially conform and/or flatten against the vessel interior wall 156. In some embodiments, the engagement surface 127 may extend along an interior surface of the canopy 124. For example, the canopy 124 may also be formed of the deformable material, such that when the engagement surface 127 is placed against the vessel interior wall 156 a portion of the canopy interior surface 126 may also deform and substantially conform and/or flatten against the vessel interior wall 156. Without being limited by theory, this may operate to increase a contact area of the umbrella 116 and the vessel interior wall 156, increasing the mechanical strength of the seal for the apparatus 100 as a whole. Moreover, the engagement surface 127, the canopy 124, or both being deformable may be desired in vessels with blemishes, wall buildups, and non-planar contours, as the engagement surface 127, the canopy 124, or both may better conform against the vessel interior wall 156.

In embodiments, and as illustrated in FIGS. 1-8, the apparatus 100 may further comprise a sealing cap 120. As shown in FIGS. 1-8, the sealing cap 120 may be in contact with the canopy 124, the end member 117, or both. The sealing cap 120 may additionally be configured to encapsulate an exterior of the end member 117, at least a portion of the exterior of the canopy 124, or both. The sealing cap 120 may comprise a deformable material, similar or identical to the canopy 124, the engagement surface 127, or both. For example, and as shown in FIGS. 2 and 4, by comparison, the sealing cap 120 may deform as the umbrella 116 goes from the retracted to the protracted position, thereby maintaining a seal against the exterior of the canopy 124. In embodiments, the sealing cap 120 may be sealed against the exterior of the canopy 124 and/or the end member 117 utilizing any adhesive known in the art.

In embodiments, the canopy 124, the end member 117, the sealing cap 120, or combinations thereof may comprise an elastomer, a metal alloy, or combinations thereof. For example, and in embodiments, one or more of the canopy 124, the end member 117, and the sealing cap 120 may have a laminate or coated structure, for example a metal alloy substrate coated with an elastomeric coating, or an elastomer-metal alloy-elastomer laminate. The elastomers may include, but may not be limited to rubber, neoprene, fluorocarbons, polyurethane, or combinations thereof.

In embodiments, the canopy 124 may comprise a frusto-conical shape comprising a plurality of ridges having a first height in the retracted position, as shown for example in FIG. 1. The height of the ridge(s) may be measured from the valley of the ridge to the peak of the ridge. The canopy 124 comprising the frusto-conical shape may comprise the plurality of ridges having a second height in the protracted position, wherein the second height is less than the first height, as shown for example in FIGS. 3 and 5. In other words, the canopy 124 may be configured to transition between the first height and the second height of the ridges when actuated from the retracted to protracted position, similar to a canvas rain umbrella.

In embodiments, the canopy 124 may comprise a plurality of overlapping members, a plurality of interlocking members, or combinations thereof, spaced along a circumference of the canopy 124. One or more of the plurality of overlapping members, one or more of the plurality of interlocking members, or both, may be coupled to the end member 117, the sealing cap 120, or both. In embodiments, the plurality of overlapping members, the plurality of interlocking members, or both may have a fan-like shape, although this is not required.

In embodiments, the vessel 155 may be planar, non-planar, convex, or combinations thereof in one or more directions. Without being limited by theory, the apparatuses 100 herein may be particularly suited to convex vessels. For example, and as shown in FIG. 8, after the engagement surface 127 contacts the convex vessel interior wall 156 in the protracted position, further actuation may generate a pretensioning of the engagement surface 127 and the canopy 124 against the vessel interior wall 156 as the canopy 124 may not freely expand outwards due to continued contact against the convex surface. Further, convex vessels may contribute to a self-sealing of the apparatus 100 as pressurization and/or pressure testing is conducted. Particularly, during pressurization and/or pressure testing, the gradual increase in fluid pressure within the sealed interior space may contribute to a slight expansion of the canopy 124 around the engagement surface 127. Similar to further actuation, this slight expansion may generate a pretensioning of the engagement surface 127 and the canopy 124 against the vessel interior wall 156, thereby also increasing the degree of the seal.

Without being limited by theory, for non-convex vessels the lack of the pretensioning effect may be minimized by structurally reinforcing or forming the canopy 124 with a material or matrix of a sufficient stiffness or Young's Modulus such that the canopy 124 does not deform outwards during pressurization and/or pressure testing. Accordingly, in embodiments, the canopy 124 may further comprise a structural reinforcement including but not limited to wires, ribbing, external banding, or combinations thereof. In embodiments, the rod 104, the housing 160, the plurality of spoke members 136, the internal shaft 137, the first plunger 133, the second plunger 135, and the protrusion 140 may comprise a metal alloy.

As previously stated, embodiments herein are also directed to methods of testing and/or isolating connections between a vessel 155 and a pipe and/or nozzle 150 extending therefrom, and particularly to methods for pressure testing of the nozzle 150 of the vessel 155. In embodiments, an initial step of the method may comprise providing the vessel 155, the nozzle 150, and the apparatus 100. The apparatus 100, nozzle 150, and vessel 155 may be any of apparatuses, nozzles, or vessels hereinbefore discussed. The method may then comprise fastening the apparatus 100 to the outer end 151 of the nozzle 150, such as by the nozzle-contacting portion 161 of the housing 160. The method may also comprise inserting the umbrella 116 through the inner end 152 of the nozzle 150, before, concurrently, or after fastening the apparatus 100 to the outer end 151 of the nozzle 150. The umbrella 116 may be in the retracted position when it is inserted through the inner end 152 of the nozzle 150.

The method may then comprise actuating the umbrella 116 to the intermediate position, the protracted position, or the further protracted position through the actuation portion 132. The method may then comprise sealing the engagement surface 127 against the vessel interior wall 156. In embodiments, sealing the engagement surface 127 against the vessel interior wall 156 may comprise withdrawing the rod 104 from the vessel 155 until the engagement surface 127 contacts the vessel interior wall 156, further actuating the umbrella 116, or combinations thereof. Without being limited by theory, it is contemplated that the combination of the locking portion 109 having the plurality of the threads and the fastener 110, namely by tightening the fastener 110 on the plurality of threads of the locking portion 109 and against the non-nozzle contacting portion 162, may be operable to further draw the engagement surface 127 against the vessel interior wall 156, without further actuation of the umbrella 116.

Without being limited by theory, an operator may determine that the engagement surface 127 has contacted the vessel interior wall 156 through observation of increased resistance or tension during withdrawal of the rod 104. After sealing the engagement surface 127 against the vessel interior wall 156, the method may further comprise introducing a fluid into the central opening 163, such as through the inlet flow line 170. In embodiments, the fluid may comprise a liquid, a gas, or combinations thereof. The gas may be an inert gas, such as, but not limited to nitrogen. Without being limited by theory, the introduction of an inert gas such as nitrogen into the sealed interior space may mitigate corrosion during the welding or fitting of the nozzle 150 to the vessel 155.

The method may then comprise pressurizing the sealed interior space and observing the vessel 155 and the nozzle 150 for leakage of the fluid. The method may then comprise depressurizing the sealed interior space by removing the fluid, such as through the outlet flow line 174. After removal of the fluid, the apparatus 100, the umbrella 116, or both may then be advanced into the vessel 155 until the engagement surface 127 does not contact the vessel interior wall 156. The umbrella 116 may then be de-actuated to the retracted position. The method may also comprise de-fastening the apparatus 100 from the nozzle 150 before, concurrently, or after de-actuating the umbrella 116. Finally, the apparatus 100 may be withdrawn from the outer end 151 of the nozzle 150.

It is also noted that recitations herein of "one or more" components, elements, etc., should not be used to create an inference that the alternative use of the articles "a" or "an" should be limited to a single component, element, etc. For example, a sealing element may mean one sealing element, two sealing elements, three sealing elements, and on.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising." It is noted that the use of the term "having" in this disclosure should also be interpreted in like manner as the more commonly used open-ended preamble term "comprising".

What is claimed is:

1. An apparatus for isolating a nozzle having an outer end extending externally from a vessel and an inner end opening into the interior of the vessel, the apparatus comprising:

a rod comprising proximal and distal ends;

an umbrella comprising an end member and a canopy, wherein the umbrella is coupled to the distal end of the rod, the canopy is in contact with the end member, and the canopy extends from the end member at a first angle to the rod;

an actuation portion configured to actuate the umbrella between a retracted position comprising the first angle and a protracted position comprising a second angle, wherein the second angle is greater than the first angle, the umbrella is capable of being translated through the nozzle at the first angle, and the umbrella is not capable of being translated through the nozzle at the second angle; and an engagement surface defined on a leading edge of the canopy, the engagement surface configured to form a seal against an interior wall of the vessel when the umbrella is in the protracted position.

2. The apparatus of claim 1, further comprising a housing comprising:

a nozzle-contacting portion configured to fasten to the outer end of the nozzle;

a non-nozzle-contacting portion; and a central opening, wherein the central opening extends from the non-nozzle-contacting portion to the nozzle-contacting portion, the central opening is sized to accept the rod, and the central opening further comprises a sealing element positioned on the non-nozzle-contacting portion, and wherein the rod is positioned within the central opening and has the proximal portion of the rod positioned outside the housing.

3. The apparatus of claim 1, wherein the canopy is pivotally coupled to the end member.

4. The apparatus of claim 3, wherein the actuation portion comprises:

a plurality of spoke members pivotally coupled at one end to the distal end of the rod and at the opposite end to an interior surface of the canopy;

an aperture within the rod that extends from the distal end of the rod to the proximal end of the rod; and an internal shaft that extends through the aperture, the shaft having a handle end positioned past the proximal end of the rod and a far end coupled to the end member, such that withdrawing the internal shaft from the proximal end of the rod translates the umbrella into the protracted position.

5. The apparatus of claim 4, wherein:

the aperture further comprises an aperture throat on the distal end of the rod, the aperture throat having a smaller diameter than the aperture;

the internal shaft further comprises a protrusion extending from the far end of the internal shaft, wherein the protrusion is sized to fit within the aperture throat and is coupled to the end member of the umbrella; and the aperture throat and the protrusion together define a maximum distance by which the internal shaft may extend into the aperture.

6. The apparatus of claim 3, wherein the actuation portion comprises:

a plurality of spoke members pivotally coupled at one end to the distal end of the rod and at the opposite end to the interior surface of the canopy;

an aperture within the rod that extends from the distal end of the rod to the proximal end of the rod, a first plunger positioned within the aperture on the distal end of the rod, the first plunger coupled to the end member of the umbrella;

a second plunger comprising a handle end positioned past the proximal end of the rod and a far end extending within the aperture, wherein the first plunger and the second plunger define a sealed space within the aperture between the first and second plungers, such that withdrawing the second plunger from the proximal end of the rod operates to also translate the first plunger towards the proximal end, thereby also translating the umbrella into the protracted position; and a hydraulic fluid filling the sealed space.

7. The apparatus of claim 6, wherein:

the aperture further comprises an aperture throat on the distal end of the rod, the aperture throat comprising a smaller diameter than the remainder of the aperture;

the first plunger further comprises a protrusion extending from a far end of the first plunger, the protrusion sized to fit within the aperture throat and coupled to the end member of the umbrella; and the aperture throat and the protrusion together define a maximum distance by which the first plunger and the second plunger may extend into the aperture.

8. The apparatus of claim 2, wherein the housing further comprises:

an inlet flow line fluidly connected to the central opening; and an outlet flow line fluidly connected to the central opening.

9. The apparatus of claim 8, further comprising:

an inlet valve fluidly connected to the inlet flow line;

an outlet valve fluidly connected to the outlet flow line; and one or more pressure sensors configured to sense a fluid pressure within the housing.

10. The apparatus of claim 2, wherein:

the rod further comprises a locking portion on a proximal portion of the rod; and the apparatus further comprises a fastener configured to attach to the locking portion of the rod and prevent further insertion of the rod into the housing.

11. The apparatus of claim 1, wherein the canopy, the end member, or both comprise an elastomer, a metal alloy, or combinations thereof.

12. The apparatus of claim 1, wherein the engagement surface comprises a plurality of ridges, a deformable material, or both.

13. The apparatus of claim 12, wherein:

the engagement surface extends along an interior surface of the canopy; and at least a portion of the canopy comprises the deformable material.

14. The apparatus of claim 1, further comprising a sealing cap configured to encapsulate an exterior of the end member and at least a portion of an exterior of the canopy.

15. An isolation system for a nozzle of a vessel, the system comprising:

a vessel comprising a nozzle, the nozzle comprising an outer end extending externally from the vessel and an inner end opening into the interior of the vessel; and an apparatus for isolating a nozzle comprising a housing comprising a nozzle-contacting portion, a non-nozzle-contacting portion, and a central opening, wherein the nozzle-contacting portion is configured to fasten to the outer end of the nozzle, the central opening extends from the non-nozzle-contacting portion to the nozzle-contacting portion, the central opening is sized to accept a rod of the apparatus, and the opening comprises a sealing element positioned on the non-nozzle-contacting portion, the rod comprising proximal and distal ends, wherein the rod is positioned within the central opening and has the proximal portion of the rod positioned past the non-nozzle-contacting portion, an umbrella comprising an end member and a canopy, wherein the umbrella is coupled to the distal end of the rod, the canopy is in contact with the end member, and the canopy extends from the sealing cap at a first angle to the rod, an actuation portion configured to actuate the umbrella between a retracted position comprising the first angle and a protracted position comprising a second angle, wherein the second angle is greater than the first angle and the umbrella is capable of being translated through the nozzle at the first angle and is not capable of the same at the second angle, an engagement surface defined on a leading edge of the canopy, the engagement surface configured to form a seal against an interior wall of the vessel when the umbrella is in the protracted position, an inlet flow line fluidly connected to the central opening, and an outlet flow line fluidly connected to the central opening.

16. A method of isolating a nozzle having an outer end extending externally from a vessel and an inner end opening into the interior of the vessel, the method comprising:

providing an apparatus comprising a housing comprising a nozzle-contacting portion, a non-nozzle-contacting portion, and a central opening, wherein the nozzle-contacting portion is configured to fasten to the outer end of the nozzle, the central opening extends from the non-nozzle-contacting portion to the nozzle-contacting portion, the central opening is sized to accept a rod of the apparatus, and the opening comprises a sealing element positioned on the non-nozzle-contacting portion, the rod comprising proximal and distal ends, wherein the rod is positioned within the central opening and has the proximal portion of the rod positioned past the non-nozzle-contacting portion, an umbrella comprising an end member and a canopy, wherein the umbrella is coupled to the distal end of the rod, the canopy is in contact with the end member, and the canopy extends from the sealing cap at a first angle to the rod, an actuation portion configured to actuate the umbrella between a retracted position comprising the first angle and a protracted position comprising a second angle, wherein the second angle is greater than the first angle and the umbrella is capable of being translated through the nozzle at the first angle and is not capable of the same at the second angle, an engagement surface defined on a leading edge of the canopy, the engagement surface configured to form a seal against an interior wall of the vessel when the umbrella is in the protracted position, an inlet flow line fluidly connected to the central opening, and an outlet flow line fluidly connected to the central opening;

fastening the apparatus to the outer end of the nozzle;

inserting the umbrella through the inner end of the nozzle;

actuating the umbrella to the protracted position through the actuation portion; and sealing the engagement surface against the interior wall of the vessel.

17. The method of claim 16, further comprising:

introducing a fluid into the central opening;

pressurizing a sealed interior space defined between an interior wall of the canopy of the umbrella, the central opening of the housing, the interior wall of the vessel, and an interior wall of the nozzle; and observing the vessel and the nozzle for leakage of the fluid.

18. The method of claim 17, further comprising:

depressurizing the sealed interior space by removing the fluid;

advancing the apparatus into the vessel until the engagement surface does not contact the interior wall of the vessel;

de-actuating the umbrella to the retracted position through the actuation portion;

de-fastening the apparatus from the nozzle; and withdrawing the apparatus from the outer end of the nozzle.

19. The method of claim 17, wherein the fluid is an inert gas.

20. The method of claim 16, wherein sealing the engagement surface against the interior wall of the vessel comprises:

withdrawing the rod from the vessel until the engagement surface contacts the interior wall of the vessel;

further actuating the umbrella; or combinations thereof.

* * * * *